Feb. 1, 1927. 1,616,425
F. B. FINK
LUBRICATING DEVICE
Original Filed Oct. 13, 1924

WITNESSES:
Cris Leinle
P. H. Pattison

INVENTOR,
F. B. Fink
BY Munn & Co
ATTORNEYS.

Patented Feb. 1, 1927.

1,616,425

UNITED STATES PATENT OFFICE.

FREDERICK BAY FINK, OF NEW YORK, N. Y., ASSIGNOR TO PARAGON DEVICES CORPORATION, A CORPORATION OF NEW YORK.

LUBRICATING DEVICE.

Application filed October 13, 1924, Serial No. 743,417. Renewed December 6, 1926.

The present invention relates to new and useful improvements in lubricating devices, and it pertains more particularly to a device especially adapted for use in connection with force feed lubricators of the grease cup type.

It is one of the primary objects of the invention to provide means whereby a force feed grease cup may be filled without removing it from its position relative to the mechanism which it is used to lubricate.

It is a further object of the invention to provide means capable of interposition between a lubricant receptacle and a mechanism, such, for example, as a bearing to be lubricated, which device will permit of lubrication of the bearing independent of the lubricant receptacle, a filling of the lubricant receptacle independent of the bearing to be lubricated, or supplying lubricant directly and simultaneously to both the lubricant receptacle and the mechanism or bearing to be lubricated.

It is a further object of the invention to provide a device of this character which may be used in connection with grease cups as commonly manufactured without necessitating any structural or other change of the grease cup.

With the above and other objects in view reference is had to the accompanying drawings, in which—

Figure 1:
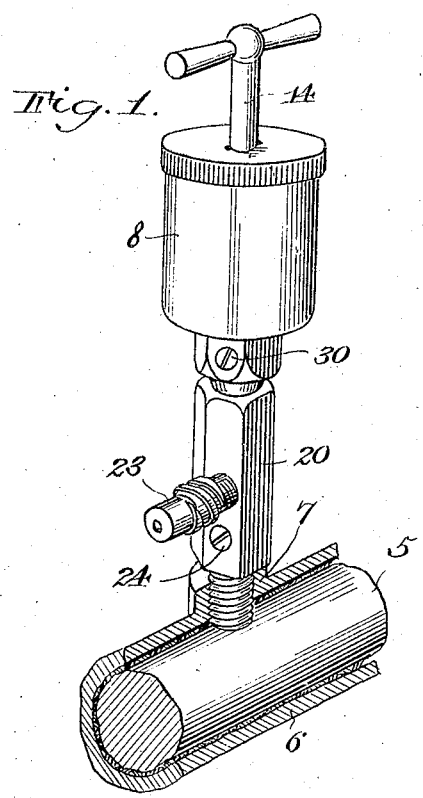
Figure 1 is a perspective view showing the manner in which a device constructed in accordance with the present invention is used.

Referring more specifically to the drawings and particularly to Fig. 1, the reference numeral 5 designates a shaft mounted in a bearing 6, said bearing having an internally screw-threaded lug 7 or the like, to which a grease cup is adapted to be secured. All of this is conventional construction.

Figure 2:
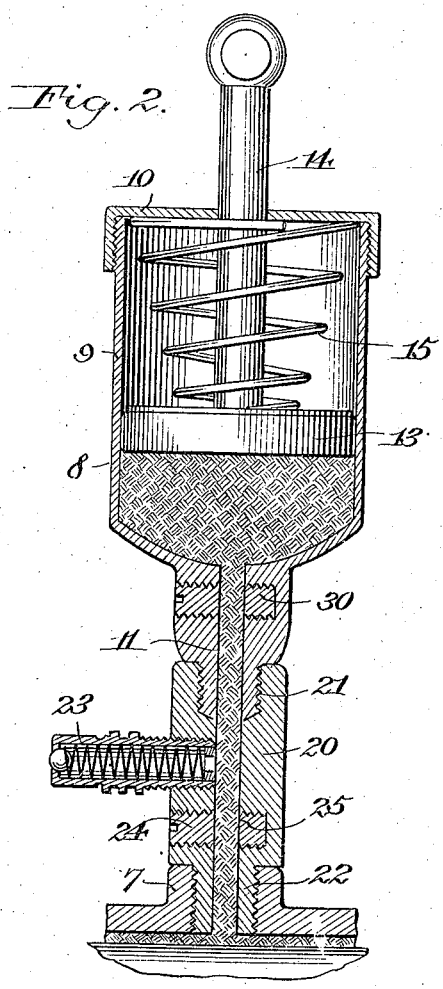
Fig. 2 is a longitudinal sectional view showing the manner in which a device constructed in accordance with the present invention is used and operated.

The reference numeral 8 designates a grease cup or lubricant receptacle, and, as shown in Figure 2, the lubricant receptacle comprises a shell 9 having a removable cover 10 and a discharge opening 11. Mounted within the shell 9 there is a piston 13 having a piston rod 14, which projects through an opening in the cover 10. Interposed between the cover 10 and the piston 16 there is a coil spring 15, under the influence of which the plunger continuously forces lubricant from the lubricant receptacle 9 by way of the discharge opening or outlet 11 thereof.

In carrying out the invention, a tubular member 20 is employed, such tubular member having an internally screw-threaded recess 21 on one end and an externally threaded boss or projection 22 upon its other end. Projecting radially of the tubular member 20, there is an injecting nipple 23 of a conventional type. Interposed between the injecting nipple 23 and the externally threaded projection 22, there is a valve 24 provided with a passage 25 extending therethrough.

The form of the invention shown in Figures 1 and 2 is adapted for use in connection with grease cups provided with a valve 30 similar to the valve 24 heretofore mentioned and is used in the following manner:

The threaded extension 22 is engaged with the boss 7 of the bearing within which the grease cup would ordinarily be mounted. The threaded projecting portion of the grease cup is then engaged with the interiorly threaded recess 21 in order to mount the grease cup upon the bearing by means of the fitting.

With the parts in the position shown in Fig. 2, when it is desired to replenish the supply of lubricant in the lubricant receptacle, it is only necessary to close the valve 24, place a pressure gun on the injecting nipple 23 and force the lubricant under pressure through the injecting nipple 23, its only movement being in the direction of the lubricant receptacle.

If a gun capable of producing sufficient pressure to overcome the spring 15 is employed, the lubricant may be injected into the lubricant receptacle against the pressure of said spring until the lubricant receptacle has been completely filled.

If it is desired to lubricate the bearing direct without employing the lubricant receptacle, it is only necessary to close the upper valve 30 and open the lower valve 24, in which case the lubricant will be forced direct to the bearing.

It sometimes happens that it is desirable to cleanse the bearing, and in this case the upper valve 30 would be closed and a suitable cleansing fluid forced through the fitting to the bearing to dislodge the grease or otherwise clean the bearing. After this has been done, the bearing may be again lubricated in any of the above-described manners.

Figure 3:
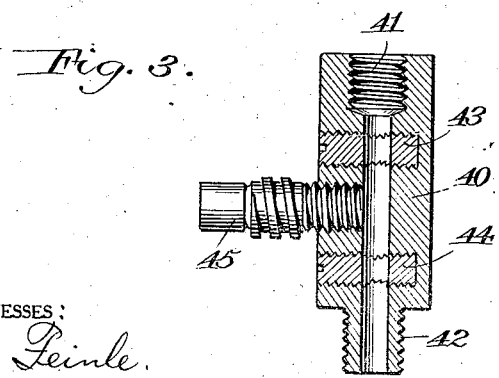
Fig. 3 is a detail longitudinal sectional view of a modified form of the invention.

Referring to Fig. 3 in which is shown a modified form of the invention, the fitting comprises a tubular member 40 having an internally screw-threaded recess 41 and an externally screw-threaded projection 42. Mounted in the fitting 40 there are two valves 43 and 44, and intermediate of the valves 43 and 44 there is an injecting nipple 45. The fitting illustrated in this form of the invention is adapted for use in connection with grease cups having no valve, there being two valves carried by the fitting, and it is obvious that this form of the invention operates in the same manner as that described for the preferred form.

From the foregoing it is apparent that the present invention provides a lubricating device, by means of which grease cups may be replenished without removal from their mountings. The device further provides means for flushing or washing out a bearing without removing the grease cup thereof, and, at the same time, without affecting the lubricant within the grease cup.

From the foregoing it is apparent that all of the objects of the present invention have been accomplished, and, further, it should be understood that numerous modifications of structure might readily be resorted to without in the least departing from the scope of the claims.

What is claimed is:

1. A lubricating device comprising a lubricant receptacle adapted for attachment to a bearing to be lubricated, and a fitting adapted for interposition between the bearing to be lubricated and the lubricant receptacle, said fitting comprising a substantially tubular member, a lubricant injecting nipple carried thereby, and a plurality of valves, whereby lubricant may be forced simultaneously or selectively to the lubricant receptacle or the bearing from said lubricant injecting nipple.

2. A device of the character described comprising a fitting, means for attaching said fitting to the bearing to be lubricated, means for attaching a force feed lubricator including a lubricant receptacle to the fitting, and means carried by the fitting for injecting a lubricant into the lubricant receptacle and the bearing simultaneously, said means comprising a plurality of valves and an injecting nipple interposed with respect to said valves, said injecting nipple being carried by the fitting.

3. For use in conjunction with a lubricating device, a fitting comprising a body having a passage therethrough, attaching means at each end of the body, valve members carried by the body and each being operable for controlling said passage, and an injecting device connected to said body and being in communication with said passage.

FREDERICK BAY FINK.